A. B. SPERRY.
TRACTOR OR TRUCK.
APPLICATION FILED JUNE 11, 1917.

1,257,416.

Patented Feb. 26, 1918.

WITNESS
J. Herbert Bradley.

INVENTOR
Arthur B. Sperry
by Dennis B. Wolcott
Atty

UNITED STATES PATENT OFFICE.

ARTHUR B. SPERRY, OF PITTSBURGH, PENNSYLVANIA.

TRACTOR OR TRUCK.

1,257,416.  Specification of Letters Patent.  Patented Feb. 26, 1918.

Application filed June 11, 1917.  Serial No. 174,030.

*To all whom it may concern:*

Be it known that I, ARTHUR B. SPERRY, residing at Pittsburgh, in the county of Allegheny and State of Pennsylvania, a citizen of the United States, have invented or discovered certain new and useful Improvement in Tractors or Trucks, of which improvement the following is a specification.

The invention described herein relates to certain improvements in traction motors, trucks, etc., and has for its object a construction wherein power is applied to all the driving wheels, which are so combined with the chassis or motor support platform as will permit of the tractor or truck being turned in a space of a diameter not much greater than the distance between the axes of the driving wheels. The invention is hereinafter more fully described and claimed.

Figure 1:
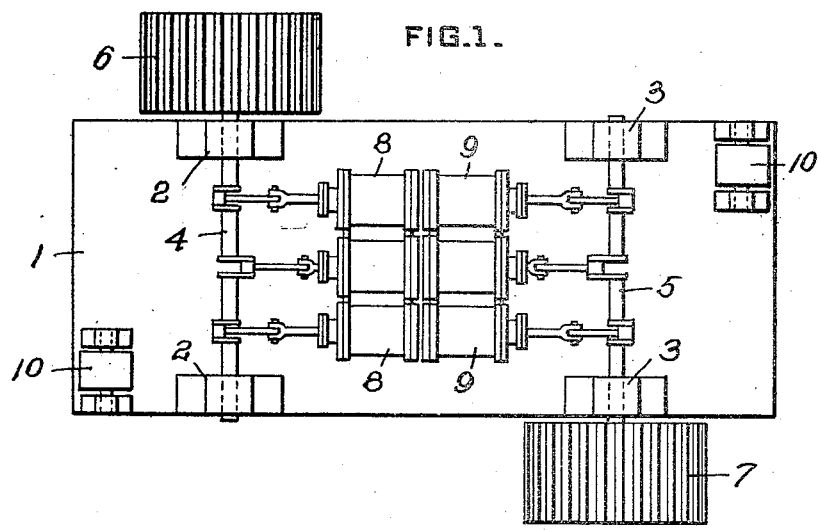
Figure 2:
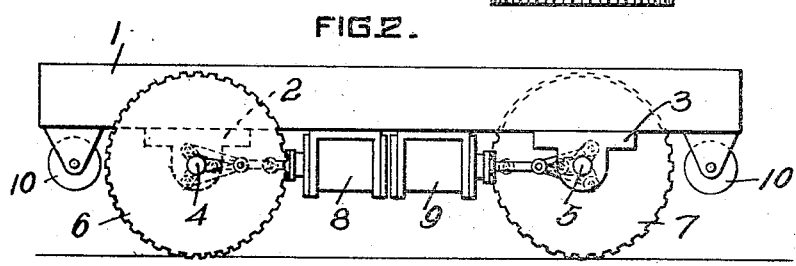
Figure 3:
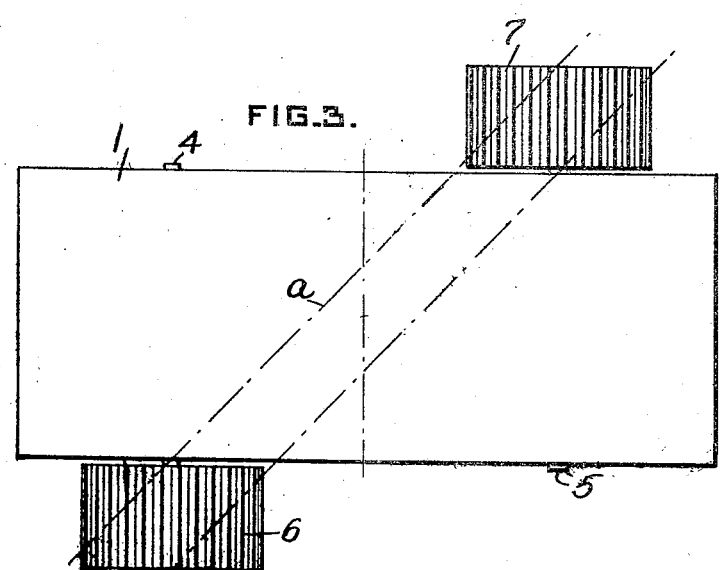

In the accompanying drawings forming a part of this specification Figure 1 is a plan view of the underside of a tractor embodying the invention described herein. Fig. 2 is a side elevation of the same and Fig. 3 is a top plan view.

In the practice of the invention, the platform or chassis 1 may be constructed in any suitable manner, and to the chassis or platform are secured bearings 2 and 3 for the respective shafts 4 and 5. Opposite ends of the shafts project beyond the sides of the chassis, and on these projecting ends are secured the wheels 6 and 7 which are suitably constructed for traction purposes. These shafts are operatively connected to independent motors 8 and 9 which may be of the internal combustion or the steam operated type. It will be understood that when internal combustion motors are employed, suitable reversing gearing known in the art will be employed. The driving units, each of which consists of a shaft, its motor and wheel are symmetrically arranged on opposite sides of the center of the chassis or platform, so as to counterbalance one another. Stability will be increased by employing wheels with wide treads as will be seen by reference to Fig. 3. If the left hand end of the chassis be depressed, the points on the inner edge of the wheel 6 and the outer edge of the wheel 7 form fulcrum points, and as the line *a* connecting these points passes between the depressed end and the center of the chassis there will be a greater weight to the right of the axis of the tipping movement and the chassis will return to horizontal position as soon as the counterbalancing weight or force is removed.

As the wheels are independently driven, the turning of the tractor can be effected by rotating either wheel, while the other stops or turns in the reverse direction, thereby effecting a turn in space having a diameter not substantially greater than the length of the tractor.

In order to prevent excessive tipping auxiliary supports may be arranged at the diagonally opposite unsupported corners of the chassis as shown in Figs. 1 and 2, such auxiliary supports being preferably in the form of small idler wheels 10, which, however, will not be necessary under normal conditions as the symmetrical disposition of the parts or elements forming the tractor will insure the maintainance of operative conditions at practically all times.

I claim herein as my invention:—

1. A tractor or truck having in combination a chassis or platform, two wheels arranged respectively on opposite sides of the chassis and out of line longitudinally of the chassis, and means for driving said wheels.

2. A tractor or truck having in combination a chassis or platform, two wheels arranged respectively on opposite sides of the chassis, and out of line longitudinally of the chassis and means for driving said wheels independently of each other.

3. A tractor or truck having in combination a chassis or platform, two wheels arranged respectively on opposite sides of the chassis, and equidistant from opposite ends of the chassis and reversible means for driving said wheels independently of each other.

In testimony whereof, I have hereunto set my hand.

ARTHUR B. SPERRY.